(No Model.)

F. B. FINNIGAN.
SHEARS.

No. 467,130. Patented Jan. 12, 1892.

Witnesses.

Inventor.
Frank B. Finnigan,
by Crosby & Gregory
Attys.

UNITED STATES PATENT OFFICE.

FRANK B. FINNIGAN, OF BOSTON, MASSACHUSETTS, ASSIGNOR OF ONE-HALF TO GEORGE W. HILLMAN, OF SAME PLACE.

SHEARS.

SPECIFICATION forming part of Letters Patent No. 467,130, dated January 12, 1892.

Application filed March 24, 1890. Serial No. 345,130. (No model.)

*To all whom it may concern:*

Be it known that I, FRANK B. FINNIGAN, of Boston, county of Suffolk, State of Massachusetts, have invented an Improvement in Shears, of which the following description, in connection with the accompanying drawings, is a specification, like letters on the drawings representing like parts.

This invention has for its object to improve shears and other like cutting-instruments.

My invention consists in the combination, with the shear-blades, of a pivot-screw therefor, a flanged collar threaded thereon, and a lock-nut for said collar, substantially as will be described; also, in the combination, with the shear-blades, of a pivot-screw therefor, a spring interposed between the head of said screw and the blades, a flanged collar threaded on said pivot-screw, and a lock-nut therefor, substantially as will be described.

Figure 1:
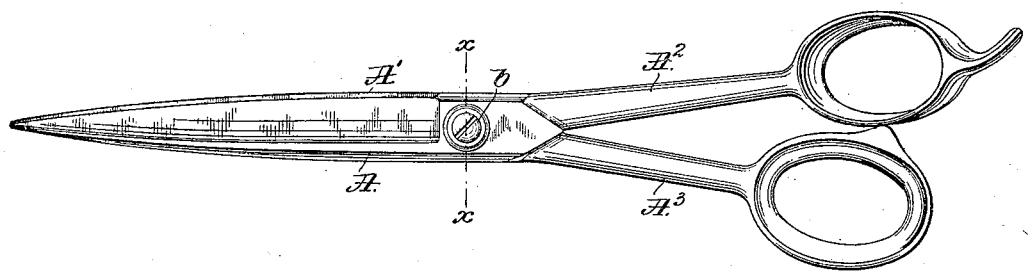
Figure 2:
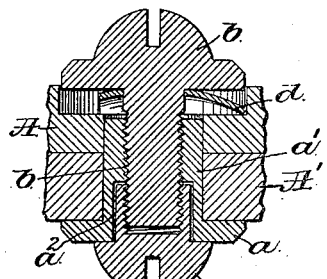
Figure 3:
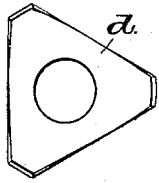

Figure 1 shows a pair of shears embodying my invention; Fig. 2, an enlarged cross-section taken on dotted line $xx$, Fig. 1; and Fig. 3, a detail to be referred to.

The blades A A' and their handles $A^2$ $A^3$ are and may be of any form or kind desired. One of the blades, as A', is provided with a hole to receive the shank $a'$ of the flanged collar $a$, said shank extending through the blade A' and forming the fulcrum or pivot on which the blade A turns. The threaded shank $a'$ of the collar $a$ receives the pivot-screw $b$, which passes through the threaded portion of the said shank (see Fig. 2) into the counterbored portion $a^2$ and receives therein the lock nut or screw $c$. A spring-plate $d$ is interposed between the head of the screw $b$ and the blade A, said spring being preferably let into a recess in said blade, as shown, so that the blades are held in yielding contact with each other by the action of said spring-plate, the strength or spring of which may be regulated by adjusting the pivot-screw $b$. When the screw $b$ has been turned to give the desired contact between the two blades, the lock nut or screw $c$ is screwed up tightly against the collar $a$, thus effectually preventing the screw $b$ from loosening.

The spring-plate herein shown is made triangular in shape and slightly crowning in the center, this being the form which I prefer to use; but I do not desire to limit myself to this particular form of spring. Neither do I desire to limit myself to the form and construction of lock-nut shown, as it is evident the same may be varied without departing from the scope of this invention. If desired, the spring may be interposed between the flange of the collar $a$ and the blade A', although I prefer the construction shown. The recess in the blade A is of greater diameter than the head of the screw $b$, so that the said screw does not act directly upon the blade A, but only indirectly through the spring $d$.

I claim—

The combination, with the shear-blades, of an internally-threaded flanged collar having its shank extended through and forming the fulcrum for said blades, the head of said collar being counterbored, a pivot-screw extended through the threaded portion of the collar, a lock-nut placed on said screw within the counterbored portion of the collar, and a spring interposed between the head of said screw and the adjacent blade to thereby keep the blades in yielding contact between said spring and flange, substantially as described.

In testimony whereof I have signed my name to this specification in the presence of two subscribing witnesses.

FRANK B. FINNIGAN.

Witnesses:
BERNICE J. NOYES,
ANNIE S. WIEGAND.